United States Patent
Wall et al.

(10) Patent No.: US 7,331,623 B1
(45) Date of Patent: Feb. 19, 2008

(54) RACK FOR SUPPORTING TWO CANOES ON PICKUP TRUCK BED

(75) Inventors: James O. Wall, Richland, MO (US); Kyle W. Bomar, Crocker, MO (US)

(73) Assignee: K & J Outdoors, Crocker, MO (US)

( * ) Notice: Subject to any disclaimer, the term of this patent is extended or adjusted under 35 U.S.C. 154(b) by 32 days.

(21) Appl. No.: 11/426,859

(22) Filed: Jun. 27, 2006

Related U.S. Application Data (60) Provisional application No. 60/805,593, filed on Jun. 22, 2006.

(51) Int. Cl.
*B60P 3/00* (2006.01)
(52) U.S. Cl. .................... 296/3; 224/405; 414/462
(58) Field of Classification Search ............ 296/3, 296/26.08, 26.09, 37.6, 26.04, 180.1, 57.1; 224/405, 403, 309; 414/462
See application file for complete search history.

(56) References Cited

U.S. PATENT DOCUMENTS

| | | | | |
|---|---|---|---|---|
| 3,565,271 A | * | 2/1971 | Deck | 414/462 |
| 3,610,431 A | * | 10/1971 | Rodden | 224/401 |
| 3,924,764 A | * | 12/1975 | Youngblood, Jr. | 414/462 |
| 4,046,273 A | * | 9/1977 | Hughes | 414/462 |
| 4,216,887 A | * | 8/1980 | Kieffer | 414/462 |
| 4,630,990 A | * | 12/1986 | Whiting | 414/462 |
| 4,953,757 A | * | 9/1990 | Stevens et al. | 224/405 |
| 5,096,216 A | * | 3/1992 | McCalla | 414/495 |
| 5,458,389 A | | 10/1995 | Young | |
| 5,544,798 A | * | 8/1996 | Shumate et al. | 296/3 |
| 5,560,666 A | | 10/1996 | Vieira | |
| 5,628,540 A | | 5/1997 | James | |
| 5,649,656 A | * | 7/1997 | Davy | 224/405 |
| 5,950,890 A | * | 9/1999 | Darby | 224/403 |
| 6,050,627 A | | 4/2000 | Lee | |
| 6,129,371 A | | 10/2000 | Powell | |
| 6,164,238 A | * | 12/2000 | Stokes | 114/353 |
| 6,189,900 B1 | * | 2/2001 | MacDonald | 414/445 |
| 6,237,824 B1 | * | 5/2001 | Bagley | 224/521 |
| 6,385,822 B1 | * | 5/2002 | Dean et al. | 24/633 |
| 6,422,441 B1 | * | 7/2002 | Settelmayer et al. | 224/324 |

(Continued)

OTHER PUBLICATIONS

The Rack Warehouse—Hitch Mount Canoe Carrier, [online], [retrieved on Sep. 12, 2005] Retrieved from Internet <URL: http://www.rackwarehouse.com/fl.html>.

(Continued)

*Primary Examiner*—Kiran B. Patel
(74) *Attorney, Agent, or Firm*—Jerry Turner Sewell (57) ABSTRACT

A removable canoe transporting rack carries two canoes on the bed of a pickup truck with an upper canoe positioned over a lower canoe. A first rack having a first horizontal member mounts in the front stake wells of the pickup truck. A second rack having a second horizontal member mounts in the rear stake wells. A third rack having an upper horizontal member and a lower horizontal member includes an engagement bar insertable into a hitch mount of the pickup truck. The lower canoe is supported by the bed of the pickup truck and the lower horizontal member of the third rack. The upper canoe is supported by the first horizontal member, the second horizontal member and the upper horizontal member of the third rack.

11 Claims, 6 Drawing Sheets

U.S. PATENT DOCUMENTS

| | | | |
|---|---|---|---|
| 6,425,618 B1* | 7/2002 | Garland et al. | 296/3 |
| 6,648,391 B1 | 11/2003 | Whiteford | |
| 7,097,408 B2* | 8/2006 | Paxton | 414/462 |
| 2004/0134953 A1* | 7/2004 | Perez | 224/403 |
| 2004/0213655 A1* | 10/2004 | Buckner et al. | 414/462 |
| 2005/0225046 A1* | 10/2005 | Wilnau | 280/47 |
| 2006/0120845 A1* | 6/2006 | Moore | 414/540 |
| 2007/0103282 A1* | 5/2007 | Caird et al. | 340/435 |
| 2007/0177964 A1* | 8/2007 | Bosela | 414/462 |

OTHER PUBLICATIONS

GORP—Two-Canoe Rack—Ask the Padding Expert, [online], [retrieved on Sep. 12, 2005] Retrieved from Internet <URL: http://gorp.away.com/gorp/activity/padding/expert/exp041101.htm>.

* cited by examiner

RACK FOR SUPPORTING TWO CANOES ON PICKUP TRUCK BED

RELATED APPLICATIONS

The present application claims the benefit of priority under 35 U.S.C. § 119(e) to U.S. Provisional Application No. 60/805,593, filed on Jun. 22, 2006.

BACKGROUND OF THE INVENTION

1. Field of the Invention

The present invention is in the field of devices for adapting vehicles to transport canoes and other similar vessels that do not fit within the cargo area of the vehicle.

2. Description of the Related Art

Canoeing is a popular recreational activity that can be enjoyed by athletes, fishermen, families with children, campers, and the like. Although the activity is quite popular, the activity is not convenient for people who do not live on or near a lake, stream or other body of water. In particular, the canoe must be transported to the locations of the planned activities. Although trailers and add-on systems for vehicles are available for transporting canoes, many systems tend to be expensive, heavy, hard to configure, or bulky to store between canoe trips. Some systems are only capable of handling one canoe. Accordingly, a need continues to exist for a low-cost, easy to install, easy to use system for transporting two canoes with a conventional pickup truck.

SUMMARY OF THE INVENTION

A removable canoe transporting rack carries two canoes on the bed of a pickup truck with an upper canoe positioned over a lower canoe. A first rack having a first horizontal member mounts in the front stake wells of the pickup truck. A second rack having a second horizontal member mounts in the rear stake wells. A third rack having an upper horizontal member and a lower horizontal member includes an engagement bar insertable into a hitch mount of the pickup truck. The lower canoe is supported by the bed of the pickup truck and the lower horizontal member of the third rack. The upper canoe is supported by the first horizontal member, the second horizontal member and the upper horizontal member of the third rack.

One aspect in accordance with embodiments of the present invention is a removable rack system for transporting two canoes on the bed of a pickup truck with an upper canoe positioned over a lower canoe. A first rack mounts in the front stake wells of the pickup truck. The first rack includes a first horizontal member for supporting a first portion of a first canoe above the bed of the pickup truck. A second rack mounts in the rear stake wells of the pickup truck. The second rack includes a second horizontal member for supporting a second portion of the first canoe above the bed of the pickup truck. A third rack has an engagement bar insertable into a hitch mount of the pickup truck. The engagement bar supports a third horizontal member at a first level generally aligned with the floor of the bed of the pickup truck. The third horizontal member receives and supports a portion of a second canoe placed in the bed of the pickup truck. The engagement bar further supports a fourth horizontal member at a level generally aligned with the first horizontal rack. The fourth horizontal member is positioned to receive a third portion of the first canoe. Preferably, the first canoe is inverted when it is placed on the horizontal members, and the second canoe is upright. Certain preferred embodiments include a barrier mounted on the first rack and positioned between the front horizontal support member and the cab of the pickup truck when the first rack is mounted in the front stake wells. Preferably, an uppermost portion of the first canoe (e.g., the bottom of the inverted first canoe) is below a level of the roof of the cab and is protected from the wind when the pickup truck is moving.

An aspect in accordance with embodiments of the present invention is a method of transporting two canoes on the bed of a pickup truck. The method includes mounting a first rack in the front stake wells of the pickup truck with a horizontal member of first rack positioned above the bed of the pickup truck. A second rack is mounted in the rear stake wells of the pickup truck with a horizontal member of second rack positioned above the bed of the pickup truck. An engagement bar of a third rack is inserted into a hitch mount of the pickup truck with the engagement bar supporting a lower horizontal member of the third rack at a first level generally aligned with the floor of the bed of the pickup truck and supporting an upper horizontal member of the third rack at a level generally aligned with the horizontal member of the first rack. The method further includes placing a first canoe in the bed of the pickup truck with a first portion resting in the bed of the pickup truck and with a second portion resting on the lower horizontal member of the third rack such that the center of gravity of the first canoe is forward of the lower horizontal member. The method further includes placing a second canoe on the horizontal member of the first rack, the horizontal member of the second rack and the upper horizontal member of the third rack such that the center of gravity of the second canoe is forward of the upper horizontal member. Preferably, the second (upper canoe) canoe is inverted and the first (lower) canoe is upright. Preferably, an uppermost portion of the second canoe (e.g., the bottom of the inverted second canoe) is below a level of the roof of the cab and is protected from the wind when the pickup truck is moving.

Another aspect in accordance with embodiments of the present invention is a removable rack system for transporting two canoes on the bed of a pickup truck with an upper canoe positioned over a lower canoe. The rack system includes a front rack, a middle rack and a rear rack. The front rack includes a first front vertical support and a second front vertical support, which are insertable into the front stake wells of the walls of the bed of the pickup truck. The front rack also includes a front horizontal support member coupled to the first front vertical support and the second front vertical support. The front horizontal support member is positionable above the bed of the pickup truck and has an upper surface to receive a first portion of a first canoe. The middle rack includes a first middle vertical support and a second middle vertical support. The two vertical supports of the middle rack are insertable into the rear stake wells of the walls of the bed of the pickup truck. The middle rack also includes a middle horizontal support member coupled to the first middle vertical support and the second middle vertical support. The middle horizontal support member is positionable above the bed of the pickup truck and has an upper surface to receive a second portion of the first canoe. The rear rack includes a horizontal hitch engagement bar having a first end insertable into a rear hitch mount of the pickup truck. A first rear vertical support has a first end attached to a second end of the horizontal hitch engagement bar and has a second end extending vertically upward for a selected distance above the second end of the horizontal hitch engagement bar. A lower rear horizontal support member is attached to the second end of the first rear vertical support.

The lower rear horizontal support member has an upper surface positioned to receive an extended portion of a second canoe. The second canoe has a portion positioned in the bed of the pickup truck. A second rear vertical support is attached to a first end portion of the lower rear horizontal support member and a third rear vertical support is attached to a second end portion of the lower rear horizontal support member. An upper rear horizontal support member has a first end portion attached to the second rear vertical support and has a second end portion attached to the third rear vertical support. The upper rear horizontal support member is positioned above the lower rear horizontal support member by a distance selected to align an upper surface of the upper rear horizontal support member with the upper surface of the front horizontal support member. The upper surface of the upper rear horizontal support member is positioned to receive a third portion of the first canoe. Preferably, the first canoe is inverted and the second canoe is upright. Also preferably, the removable rack system includes a barrier mounted on the first rack and positioned between the front horizontal support member and the cab of the pickup truck when the first rack is mounted in the front stake wells. Preferably, an uppermost portion of the first canoe (e.g., the bottom of the inverted first canoe) is below a level of the roof of the cab and is protected from the wind when the pickup truck is moving.

BRIEF DESCRIPTIONS OF THE DRAWINGS

Certain embodiments in accordance with the present invention are described below in connection with the accompanying drawing figures in which.

DETAILED DESCRIPTIONS OF PREFERRED EMBODIMENTS

The following description of an exemplary embodiment of a rack system includes dimensions of the elements or the rack system for a particular pickup truck. The dimensions are included as examples for the illustrated embodiment; however, it should be understood that the dimensions can be varied for installation on pickup trucks having different dimensions. The dimensions can also be varied to raise or lower the heights of the three racks with respect to the bed of the pickup truck and to modify the displacement of the rear rack with respect to the rear of the pickup truck.

Figure 1:
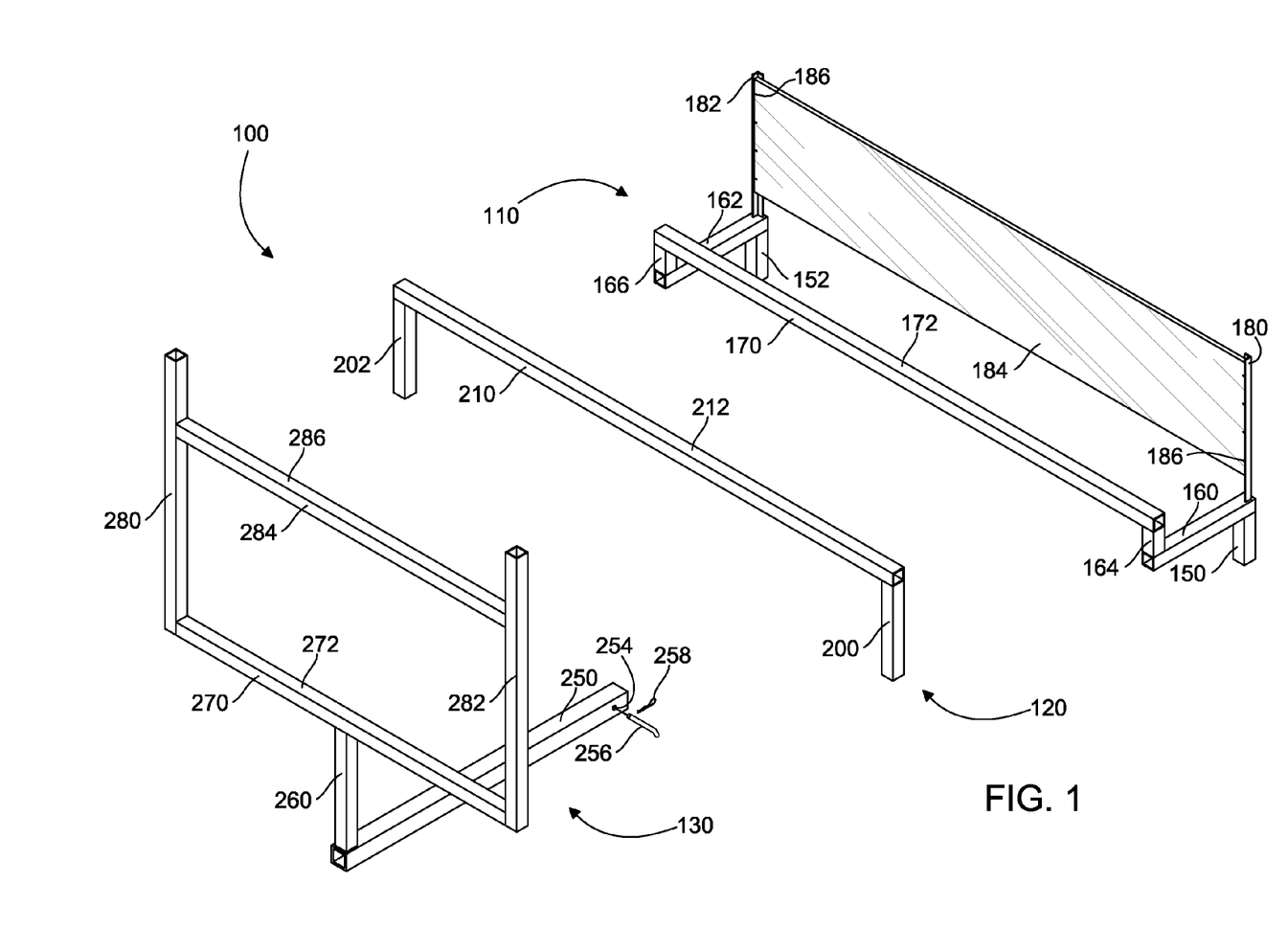
FIG. 1 illustrates a rack system for transporting two canoes prior to installation on a pickup truck, the rack system including a front rack, a middle rack and a hitch-mountable rear rack.
Figure 2:
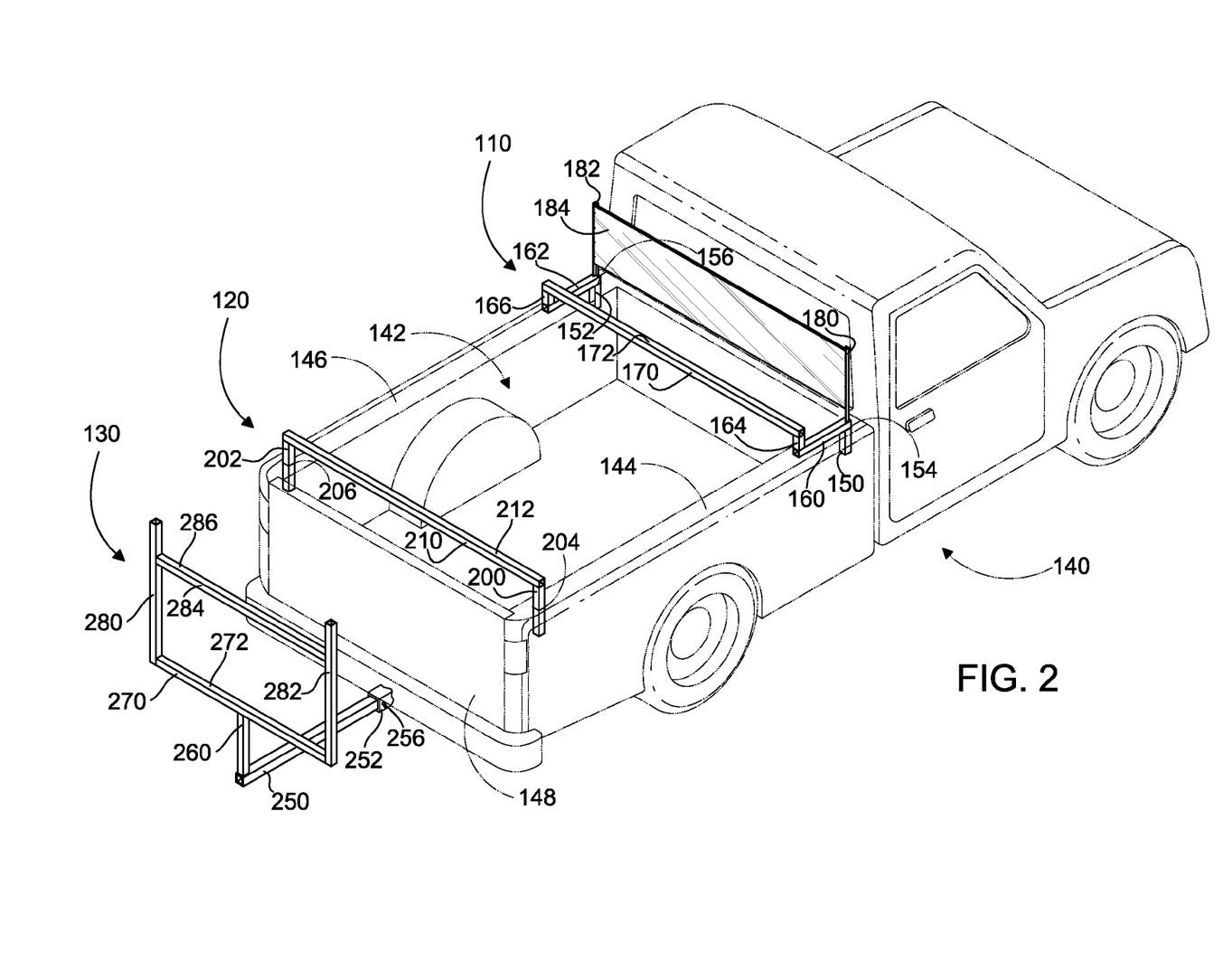
FIG. 2 illustrates the rack system of FIG. 1 installed on a pickup truck (shown in phantom) prior to placement of canoes on the rack.

FIGS. 1 and 2 illustrate a removable rack system 100 for transporting two canoes on the bed of a pickup truck. The rack system is shown in FIG. 1 prior to installation of the rack system on a pickup truck. The rack system includes a front rack 110, a middle rack 120 and a hitch-mountable rear rack 130. FIG. 2 illustrates the rack system of FIG. 1 installed on a pickup truck 140 (shown in phantom) prior to placement of canoes on the rack system. The pickup truck has a bed 142 defined in part by a right side wall 144, a left side wall 146 and a tailgate 148.

The front rack 110 comprises a first vertical interconnection segment 150 and a second vertical interconnection segment 152. The two vertical interconnection segments are sized to fit in the front stake wells in the side walls of the pickup truck 140. In particular, the first vertical interconnection segment is insertable into the right front stake well 154 in the right side wall 144, and the second vertical interconnection segment is insertable into the left front stake well 156 in the left side wall 146. For example, in the illustrated embodiment, the vertical interconnection segments comprise lengths of steel tubing having a square cross section. In the illustrated embodiment, the outside width of each side of the steel tubing is approximately 1.5 inches. The sides have a wall thickness of approximately 0.125 inch. Similar steel tubing is used for other portions of the three racks and will be referred to herein as 1.5-inch square steel tubing.

The length of each vertical interconnection segment 150, 152 on the front rack 110 is approximately 5.5 inches in the illustrated embodiment so that the vertical interconnection segment extends from the bottom of the stake well to the upper surface of the respective side wall 144, 146 of the pickup truck 140. The length of the vertical interconnection segments may be varied to accommodate different brands and models of pickup trucks having deeper or shallower stake wells. The 1.5-inch sides of the vertical interconnection segments are approximately the width of a standard stake well on certain models of pickups (e.g., a Ford F-150 pickup). Although the stake wells of many pickup trucks do not have square cross sections, the vertical interconnection segments are easily shimmed with a short length of wood or other material to reduce or eliminate movement of the segments in the stake wells. Alternatively, the vertical interconnection segments can be formed with a rectangular cross section that conforms more closely to the cross sections of the stake wells.

As further shown in FIGS. 1 and 2, a first horizontal segment 160 has a first end attached to the top of the first vertical interconnection segment 150. The first horizontal segment is positioned at 90 degrees with respect to the first vertical interconnection segment so that a second end of the first horizontal segment extends toward the rear of the pickup truck 140.

A second horizontal segment 162 is attached in like manner to the top of the second vertical interconnection segment 152. In the illustrated embodiment, each horizontal segment also comprises 1.5-inch square steel tubing. Each horizontal segment has a length of approximately 14 inches. Preferably, one side of each horizontal segment rests on the top surface of the respective side wall 144, 146 of the pickup truck 140. The opposite side of each horizontal segment is referred to as an upper surface in the following paragraph.

A first vertical support segment 164 is attached to the upper surface of the first horizontal segment 160 proximate to the second end. Similarly, a second vertical segment 166 is mounted on the upper surface of the second horizontal segment 162 proximate to the second end. Accordingly, the first vertical support segment is displaced approximately 12.5 inches from the first vertical interconnection segment 150, and the second vertical support segment is displaced approximately 12.5 inches from the second vertical interconnection segment 152. Preferably, the first vertical support segment and the second vertical support segment comprise 1.5-inch square steel tubing and have respective lengths of approximately three inches.

The front rack 110 includes a front horizontal support member 170, which has a first end attached to the top of the first vertical support segment 164 and has a second end attached to the top of the second vertical support segment 166. The front horizontal support member has a length of approximately 67 inches to generally correspond to the distance from the outer edge of the right front stake well 154 to the outer edge of the left front stake well 156. The length can be varied in other embodiments to accommodate the distance between stake wells that are spaced farther apart or closer together. The front horizontal support member advantageously comprises 1.5-inch square steel tubing.

The front horizontal support member 170 has a top surface 172. The top surface is displaced from the tops of the side walls 144, 146 of the pickup truck 140 by a distance determined by the length of each vertical support segment, the cross-sectional width of each horizontal segment and the cross-sectional width of the front horizontal support member. Accordingly, in the illustrated embodiment, the top surface of the front horizontal support member is approximately 6 inches above the top of the side of the bed and approximately 11.5 inches higher than the bottoms of the front stake wells.

As illustrated in FIGS. 1 and 2, in certain embodiments, the front rack 110 further includes a first vertical barrier support 180 attached to the top surface of the first horizontal segment 160 in approximate alignment with the first vertical interconnection segment 150. Similarly, a second vertical barrier support 182 is attached to the top surface of the second horizontal segment 162 in approximate alignment with the first vertical interconnection segment 150. In the illustrated embodiment, the vertical barrier supports advantageously comprise 0.75-inch angle iron having a thickness of approximately 0.125 inch. The vertical barrier supports are advantageously approximately 16.5 inches long. Each vertical barrier support is mounted with a respective first inside surface facing toward the rear of the pickup truck 140 and with a respective second inside surface facing toward the respective second inside surface of the other vertical barrier support. The second inside surfaces of the vertical barrier supports are spaced approximately 66 inches apart.

In the illustrated embodiment, one or more barrier boards 184 span the distance between the second inside surface of first vertical barrier support 180 and the second vertical barrier support 182. The barrier board is secured to the vertical barrier supports by a plurality of screws 186 or other suitable fastening devices. The barrier board advantageously has a length of approximately 66 inches and has width of approximately 8 to 14 inches.

The middle rack 120 advantageously comprises a first vertical support 200 and a second vertical support 202. As illustrated in FIG. 2, the vertical supports of the middle rack are insertable into the rear stake wells in the side walls 144, 146 of the pickup truck 140. In particular, the first vertical support is insertable into a right rear stake well 204, and the second vertical support is insertable into a left rear stake well 206. In the illustrated embodiment, each of the vertical supports of the middle rack has a length of approximately 10 inches. Approximately 5.5 inches of the lowermost portion of each vertical support is inserted into the respective stake well and approximately 4.5 inches of each vertical support extends above the top of the respective side wall of the pickup truck.

The middle rack 120 includes a middle horizontal support member 210, which has a first end attached to the top of the first vertical support 200 and has a second end attached to the top of the second vertical support 202. The middle horizontal support member has a length of approximately 67 inches. The middle horizontal support member advantageously comprises 1.5-inch square steel tubing. Accordingly, when the vertical supports of the middle rack are inserted in the respective rear stake wells, a top surface 212 of the middle horizontal support member is positioned approximately 6 inches above the tops of the side walls of the pickup truck and is generally in alignment with the front horizontal support member 170.

In the illustrated embodiment, the top surface 172 of the front horizontal support member 170 and the top surface 212 of the middle horizontal support member 210 are both 6 inches above the tops of the side walls of the pickup truck 140. In alternative embodiments, the top surface of the middle horizontal support member may be positioned at a different height by suitable selection of the lengths of the vertical supports 200, 202.

Figure 3:
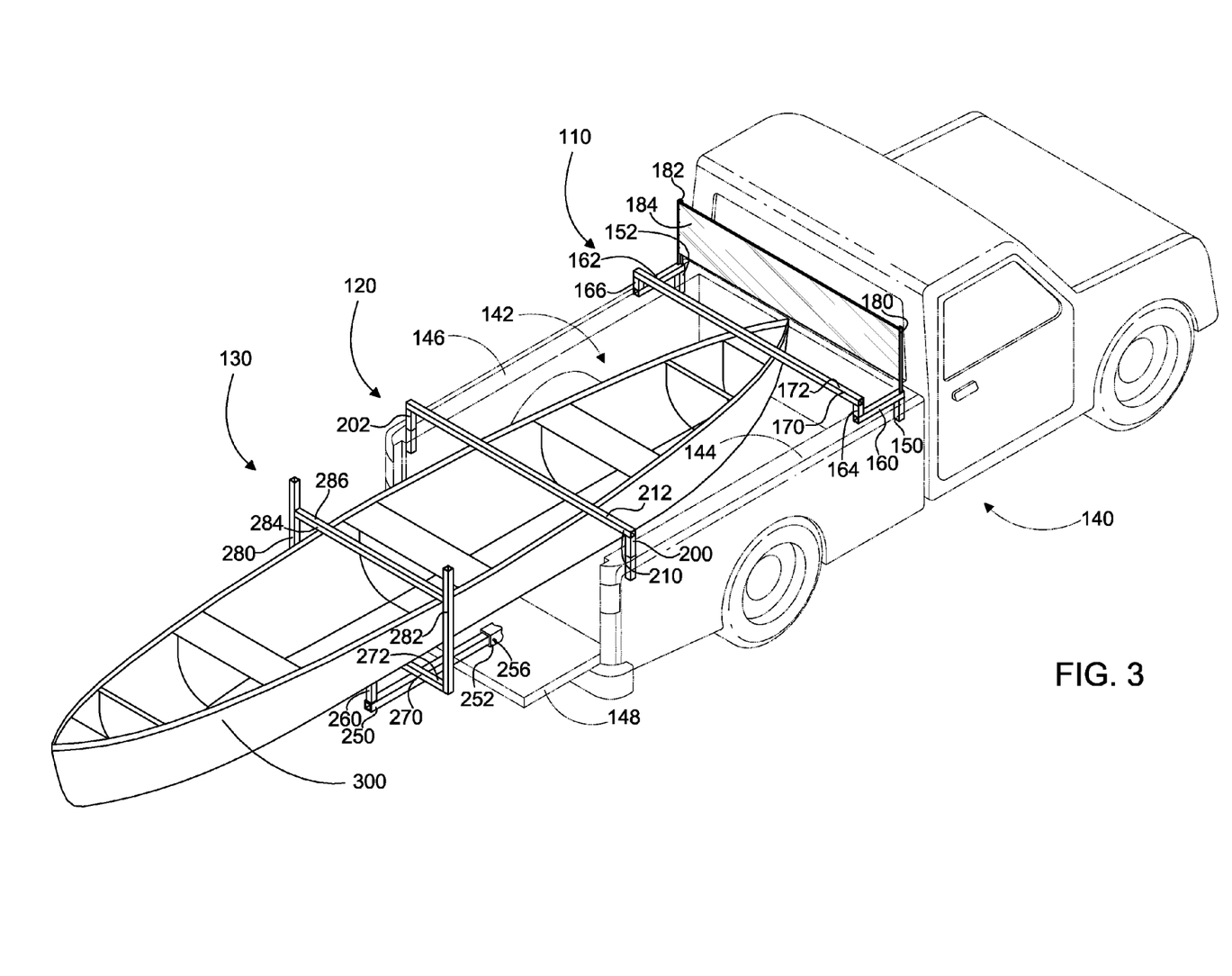
FIG. 3 illustrates the placement of a first (lower) canoe in the bed of the pickup truck with the extended end of the canoe supported by the lower horizontal support member of the hitch-mounted rear rack of the rack system.
Figure 4:
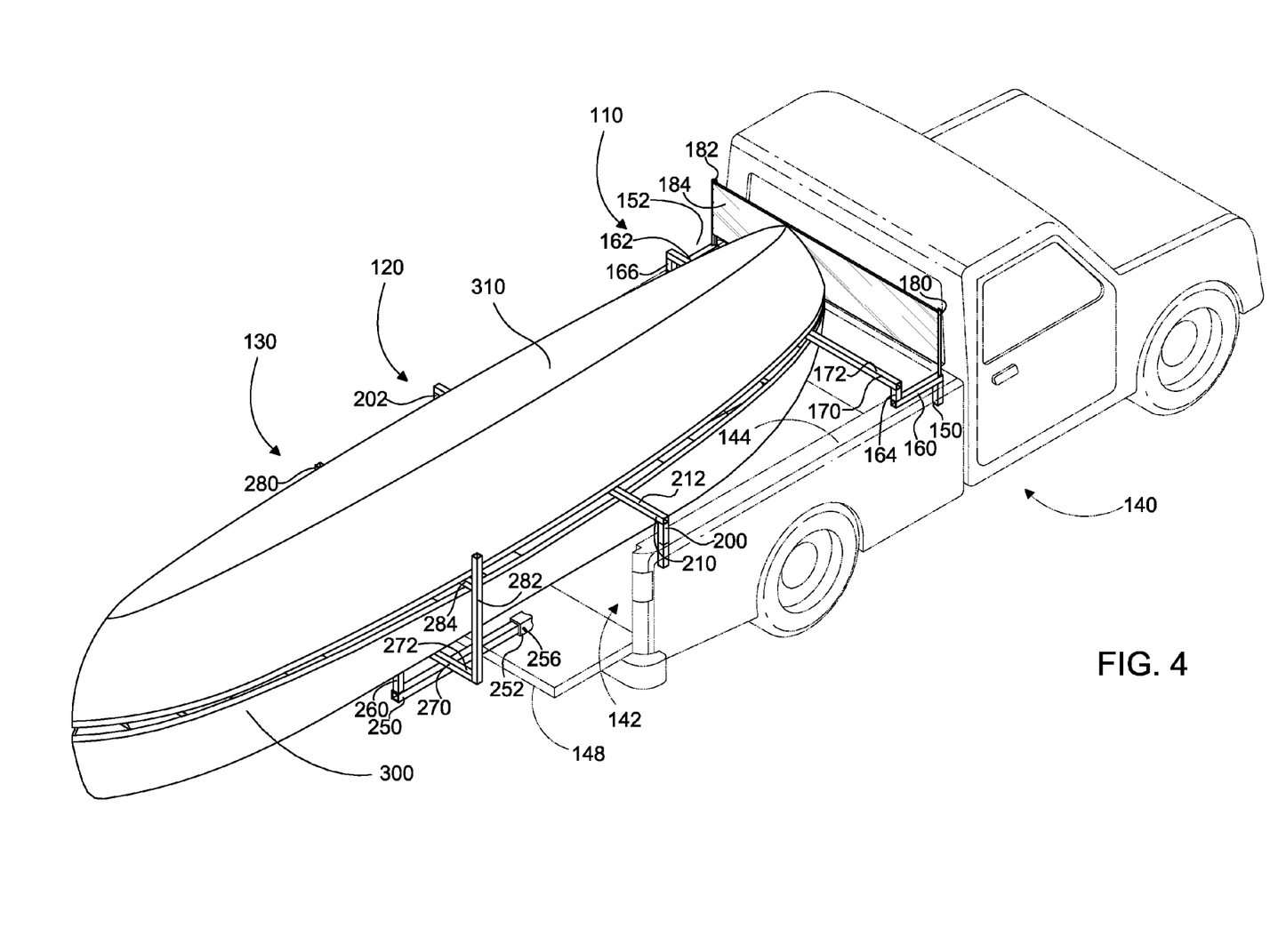
FIG. 4 illustrates the placement of a second (upper) canoe on the rack system with a first end of the canoe supported by the front rack, a middle portion of the canoe supported by the middle rack, and an extended portion of the canoe supported by the upper horizontal support member of the hitch-mounted rear rack of the rack system.

The rear rack 130 comprises a horizontal hitch engagement bar 250 that is insertable into a conventional hitch mount 252 secured to the pickup truck 140 approximately in the center of the rear of the pickup truck. In the illustrated embodiment, the hitch mount has a square engagement opening that is slightly greater than two inches on each side. The hitch engagement bar comprises steel tubing having a square cross section with an outside dimension of approximately 2 inches so that the engagement bar fits within the hitch mount. The engagement bar includes a hole 254 on each of the vertical sides proximate the forward end of the engagement bar. The holes in the engagement bar align with corresponding holes in the vertical sides of the hitch mount when the engagement bar is properly inserted into the hitch mount. The engagement bar is secured to the hitch mount by a hitch pin 256 that passes through the aligned holes and is secured with a clip 258. In the illustrated embodiment, the hitch engagement bar has a length of approximately 37 inches such that approximately 34 inches extends to the rear from the hitch mount 252. This length can be varied as desired to reduce or increase the distance by which the rear rack is displaced from the rear of the pickup truck. Preferably, the rear rack is displaced sufficiently behind the rear of the pickup truck to allow the tailgate 148 to be lowered as shown in FIGS. 3 and 4.

The rear rack 130 further includes a first vertical support 260, which is attached to a rear portion of the top surface of hitch engagement bar 250. The first vertical support comprises 1.5-inch square steel tubing. The first vertical support of the rear rack has a length of approximately 13.75 inches.

The rear rack 130 further includes a lower rear horizontal support member 270 comprising 1.5-inch square steel tubing with a length of approximately 48 inches. The midpoint of the lower surface of the lower rear horizontal support member is attached to the top of the first vertical support 260. Accordingly, in the illustrated embodiment, the upper surface 272 of the lower rear horizontal support member is approximately 15.25 inches above the top surface of the hitch engagement bar 250. The length of the first vertical support is selected so that the top surface of the lower rear horizontal support member is approximately aligned with the bottom of the bed 142 of the pickup truck 140 and the inner surface of the tailgate 148 when lowered as shown in FIGS. 3 and 4.

The rear rack 130 further includes a second vertical support 280 attached to the left end of the lower rear horizontal support member 262 and a third vertical support 282 attached to the right end of the lower rear horizontal support member. Each of the second and third vertical supports comprises 1.5-inch square steel tubing and has a length of approximately 31.75 inches. The rear rack includes an upper rear horizontal support member 284, which is attached to the second and third rear vertical supports such that the upper surface 286 of the upper rear horizontal support member is approximately 25 inches above the upper surface of the lower rear horizontal support member. The placement of the upper rear horizontal support member is selected so that the upper surface of the upper rear horizontal support member is generally aligned with the upper surface 212 of the middle horizontal support member 210 and with the upper surface 172 of the front horizontal support member 170.

In the illustrated embodiment, a portion of each of the second rear vertical support 280 and the third rear vertical support 282 extends above the upper surface 286 of the upper rear horizontal support member 284 by approximately 5.25 inches to provide barriers to lateral movement of a canoe mounted on the upper rear horizontal support member.

FIG. 3 illustrates the placement of a first (lower) canoe 300 in the bed 142 of the pickup truck 140. As illustrated, a first portion of the first canoe is supported by the bed of the pickup truck and by the inner surface of the lowered tailgate 148; however, a second portion of the canoe extends beyond the lowered tailgate and is supported by the upper surface 272 of the lower rear horizontal support member 270. The second portion of the canoe is readily securable to the lower rear horizontal support member so that the second portion of the canoe does not move significantly when the pickup truck is traveling over rough roads.

Since the second rear vertical support 280 and the third rear vertical support are positioned at the respective ends of the lower rear horizontal support member 270, the first canoe 300 is positioned substantially in the middle of the bed 142 of the pickup truck 140.

FIG. 4 illustrates the placement of a second (upper) canoe 310 on the upper surface 172 of the front horizontal support member 170 of the front rack 110, on the upper surface 212 of the middle horizontal support member 210 of the middle rack 120, and on the upper surface 286 of the upper rear horizontal support member 284 of the rear rack 130. In particular, the second canoe is inverted and placed on the support member with the gunwales of the second canoe in contact with the support members. If a portion of the gunwale of the canoe is substantially lower than other portions of the gunwale, the height of the middle horizontal support member may be adjusted so that the all three horizontal support members are in contact with the gunwales of the canoe. The second canoe is advantageously secured to the three horizontal support members by elastic straps such as bungee cords (not shown) or other suitable restraining devices. Attachment rings (not shown), such as, for example, eyebolts, may be secured to the horizontal support members or to the vertical supports to provide convenient attachment locations. Additional restraining devices (not shown) may also be used to secure the first canoe and the second canoe directly to the bed 142 or sidewalls 144, 146 of thee pickup truck 140.

As illustrated in FIG. 4, the second canoe 310 positioned directly over the first canoe 300 in the middle of the truck bed 142 so that the portions of the bed between the sides of the canoes and the walls 144, 146 are available for transportation of other equipment. Furthermore, the volume between the two canoes may be used for transportation of additional equipment with the first canoe containing the equipment and with the second canoe providing at least partial protection from the wind during movement. Although the two canoes are mounted close to each other, the horizontal support members maintain the spacing between the two canoes so that the two canoes do not bounce against each other during movement over rough roads. The illustrated embodiments provide the further benefit that the second (upper) canoe is at least partially protected from the wind when in motion to reduce or eliminate the drag that would be encountered if the second canoe were mounted over the cab. In particular, in the embodiment illustrated in FIG. 4, the uppermost portion of the second canoe (e.g., the bottom of the second canoe when inverted as shown) is below the level of the roof of the cab.

As further illustrated in FIGS. 3 and 4, the first canoe 300 and the second canoe have sufficient lengths that approximately half of each canoe extends beyond the rear of the pickup truck 140. Absent the rear rack 130 to provide support to the extended portions of the two canoes, the rearward ends of the two canoes would be cantilevered from the rear of the pickup and would be unstable in the bed of the pickup. Additional force would be needed to secure the forward ends of the canoes to counteract the weight of the extended rearward portions of the two canoes. The rear rack provides a third support location for each canoe so that the centers of gravity of the canoes are between the rear rack and the middle rack. Thus, the two canoes are fully supported by the horizontal support members and the only force required by the tie downs is to keep the canoes from shifting in response to bumps and turns.

It should be understood that the rack system 100 can also be used to transport a single canoe in either the upper position or the lower position. For example, if only a single canoe is transported in the upper position, the tailgate 148 can remain closed as shown in FIG. 2.

As illustrated in FIG. 4, the barrier board 184 is positioned between the front end of the second canoe 310 and the cab of the pickup 140. In particular, the barrier board protects the rear window of the pickup truck from damage caused by movement of the second during rapid deceleration.

In the embodiment of FIGS. 1-4, the horizontal segments 160, 162 of the front rack 110 offset the front horizontal support member 170 from the front of the bed 142 of the pickup 140 so that a broader portion the second canoe is positioned on the front horizontal support member. If the front horizontal support member were positioned directly over the front stake wells 154, 156, only the small width of the front of the second canoe would be positioned on the front horizontal support member, thus providing less support for the front portion of the second canoe.

Figure 5:
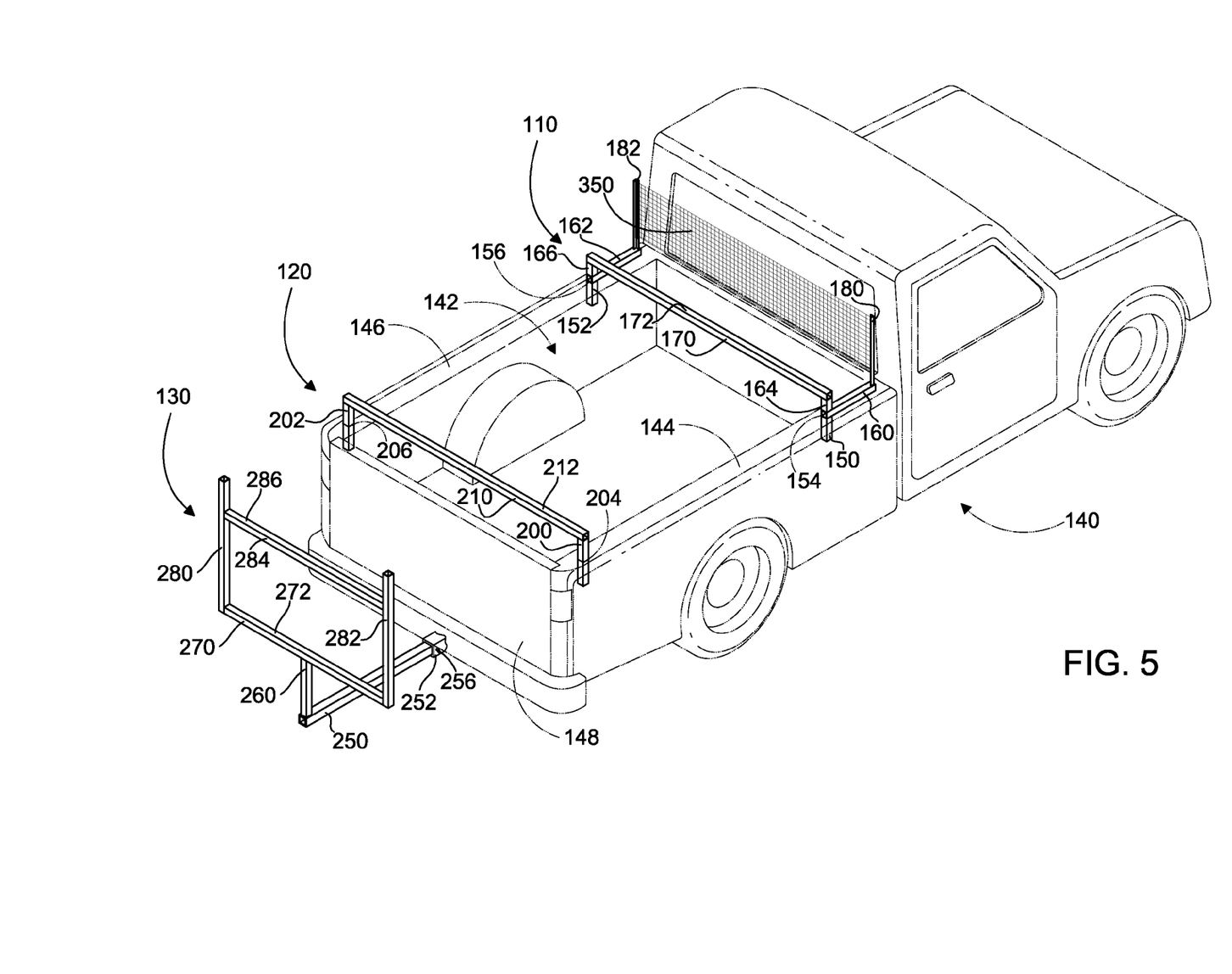
FIG. 5 illustrates an alternative embodiment of the rack system of FIGS. 1-4 in which the front rack is modified to be installed in a pair of front stake wells that are positioned farther from the cab of the pickup truck.

In some pickup trucks, the front stake wells may be offset from the front of the bed 142. For example, FIG. 5 illustrates an alternative embodiment of the rack system in which the front horizontal support member 170 is mounted directly over the front stake wells 154, 156, and the horizontal segments 160, 162 are used to displace the vertical barrier supports 180, 182 towards the cab of the pickup truck 140. FIG. 5 also illustrates an alternative embodiment for the barrier in which the barrier board 184 is replaced with a wire mesh screen 350 to allow the occupants of the pickup to monitor the canoes from the cab.

Figure 6:
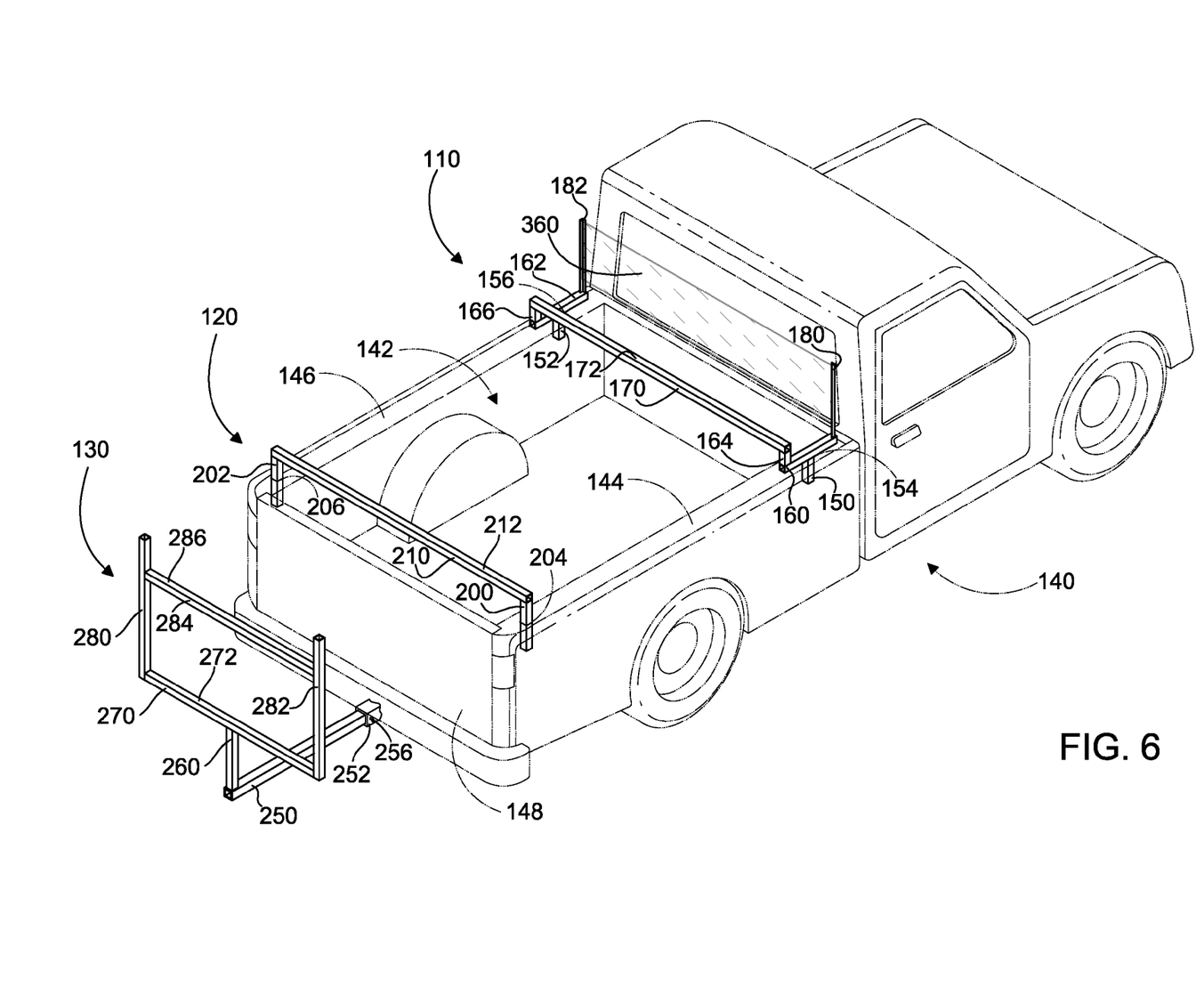
FIG. 6 illustrates an alternative embodiment of the rack system of FIGS. 1-4 in which the front rack is modified to be installed in a pair of front stake wells that are positioned at a location between the location in FIG. 1 and the location in FIG. 4.

FIG. 6 illustrates another alternative embodiment of the rack system of FIGS. 1-4 in which the front rack is modified to be installed in a pair of front stake wells that are positioned at a location between the location in FIG. 2 and the location in FIG. 4. In the embodiment of FIG. 6, a middle portion of each of the horizontal segments 160, 162 is attached to the top of the respective vertical interconnection segment 150, 152 so that the front horizontal support member 170 is displaced to the rear by a shorter distance than in FIGS. 1 and 2 and so that the vertical barrier supports are displaced forward by a shorter distance than in FIG. 5. FIG. 6 also illustrates an alternative embodiment for the barrier in which the barrier board 184 is replaced with a clear acrylic glass shield 360 to provide full visibility through the rear window of the cab of the pickup truck 140.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A removable rack system for transporting two canoes on the bed of a pickup truck with an upper canoe positioned over a lower canoe, comprising:
    a first rack mountable in the front stake wells of the pickup truck, the first rack including a first horizontal member for supporting a first portion of a first canoe above the bed of the pickup truck;
    a second rack mounted in the rear stake wells of the pickup truck, the second rack including a second horizontal member for supporting a second portion of the first canoe above the bed of the pickup truck; and
    a third rack having an engagement bar insertable into a hitch mount of the pickup truck, the engagement bar supporting a third horizontal member at a first level generally aligned with the floor of the bed of the pickup truck to receive and support a portion of a second canoe placed in the bed of the pickup truck, the engagement bar further supporting a fourth horizontal member at a level generally aligned with the first horizontal rack and positioned to receive a third portion of the first canoe.

2. The removable rack system as defined in claim 1, wherein the first canoe is inverted and the second canoe is upright.

3. The removable rack system as defined in claim 1, wherein the pickup truck includes cab with a roof, and wherein an uppermost portion of the first canoe is below a level of the roof of the cab.

4. The removable rack system as defined in claim 1, further including a barrier mounted on the first rack and positioned between the front horizontal support member and the cab of the pickup truck when the first rack is mounted in the front stake wells.

5. A method of transporting two canoes on the bed of a pickup truck, comprising:
    mounting a first rack in the front stake wells of the pickup truck with a horizontal member of first rack positioned above the bed of the pickup truck;
    mounting a second rack in the rear stake wells of the pickup truck with a horizontal member of second rack positioned above the bed of the pickup truck;
    mounting an engagement bar of a third rack into a hitch mount of the pickup truck, the engagement bar supporting a lower horizontal member of the third rack at a first level generally aligned with the floor of the bed of the pickup truck and supporting an upper horizontal member of the third rack at a level generally aligned with the horizontal member of the first rack;
    placing a first canoe in the bed of the pickup truck with a first portion resting in the bed of the pickup truck and with a second portion resting on the lower horizontal member of the third rack such that the center of gravity of the first canoe is forward of the lower horizontal member; and
    placing a second canoe on the horizontal member of the first rack, the horizontal member of the second rack and the upper horizontal member of the third rack such that the center of gravity of the second canoe is forward of the upper horizontal member.

6. The method as defined in claim 5, wherein the second canoe is inverted and the first canoe is upright.

7. The method as defined in claim 5, wherein the pickup truck includes cab with a roof, and wherein the second canoe is positioned with an uppermost portion below a level of the roof of the cab.

8. A removable rack system for transporting two canoes on the bed of a pickup truck with an upper canoe positioned over a lower canoe, comprising:
    a front rack comprising:
        a first front vertical support and a second front vertical support insertable into the front stake wells of the walls of the bed of the pickup truck; and
        a front horizontal support member coupled to the first front vertical support and the second front vertical support, the front horizontal support member positionable above the bed of the pickup truck and having an upper surface to receive a first portion of a first canoe;
    a middle rack comprising:
        a first middle vertical support and a second middle vertical support insertable into the rear stake wells of the walls of the bed of the pickup truck; and
        a middle horizontal support member coupled to the first middle vertical support and the second middle vertical support, the middle horizontal support member positionable above the bed of the pickup truck and having an upper surface to receive a second portion of the first canoe;
    and
    a rear rack comprising:
        a horizontal hitch engagement bar having a first end insertable into a rear hitch mount of the pickup truck;
        a first rear vertical support having a first end attached to a second end of the horizontal hitch engagement bar and having a second end extending vertically upward for a selected distance above the second end of the horizontal hitch engagement bar;
        a lower rear horizontal support member attached to the second end of the first rear vertical support, the lower rear horizontal support member having an upper surface positioned to receive an extended portion of a second canoe having a portion positioned in the bed of the pickup truck;
        a second rear vertical support attached to a first end portion of the lower rear horizontal support member and a third rear vertical support attached to a second end portion of the lower rear horizontal support member;

an upper rear horizontal support member having a first end portion attached to the second rear vertical support and having a second end portion attached to the third rear vertical support, the upper rear horizontal support member positioned above the lower rear horizontal support member by a distance selected to align an upper surface of the upper rear horizontal support member with the upper surface of the front horizontal support member, the upper surface positioned to receive a third portion of the first canoe.

9. The removable rack system as defined in claim 8, wherein the first canoe is inverted and the second canoe is upright.

10. The removable rack system as defined in claim 8, further including a barrier mounted on the first rack and positioned between the front horizontal support member and the cab of the pickup truck when the first rack is mounted in the front stake wells.

11. The removable rack system as defined in claim 8, wherein the pickup truck includes cab with a roof, and wherein an uppermost portion of the first canoe is below a level of the roof of the cab.

* * * * *